Oct. 7, 1924.   1,510,826
C. BREER
STOP DEVICE FOR SINKS
Filed Dec. 9, 1921   2 Sheets-Sheet 1
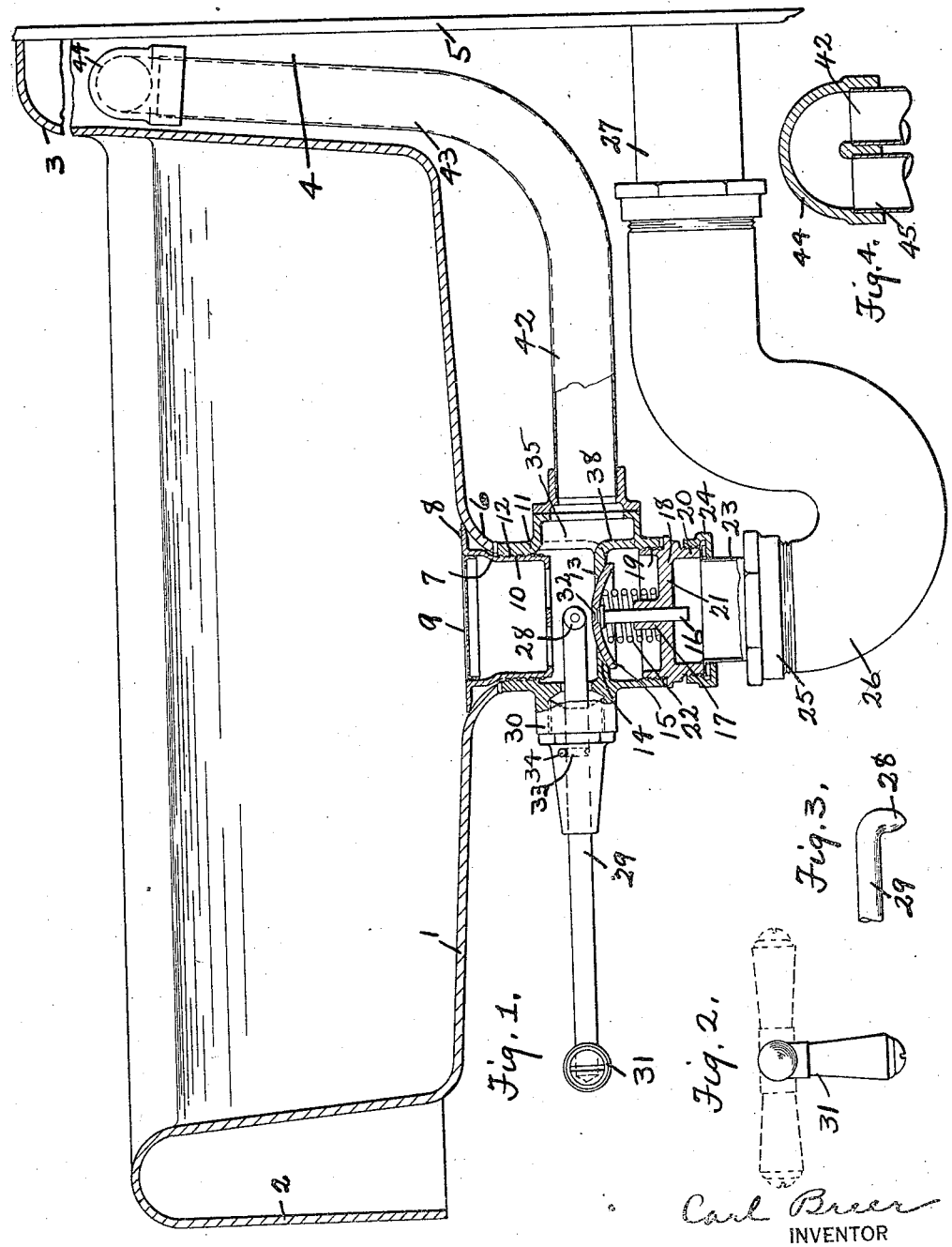

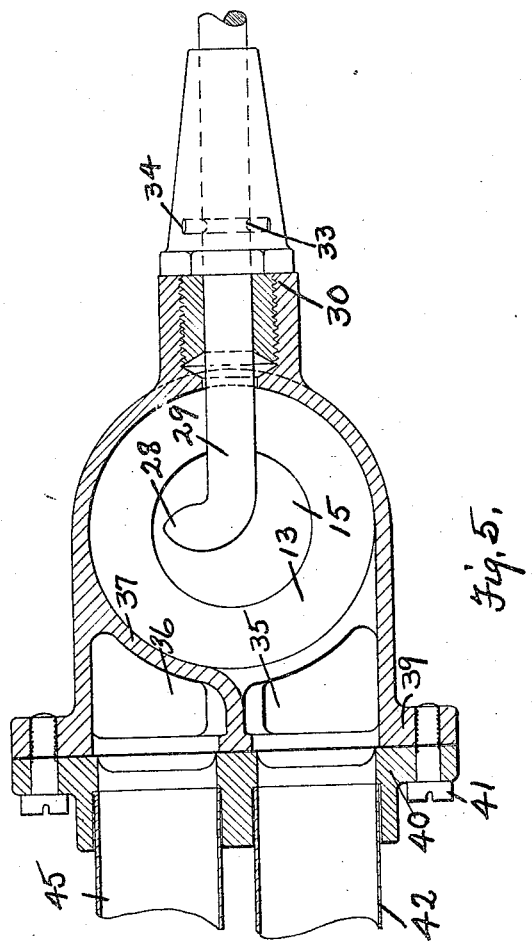

Patented Oct. 7, 1924.

1,510,826

UNITED STATES PATENT OFFICE.

CARL BREER, OF SUMMIT, NEW JERSEY.

STOP DEVICE FOR SINKS.

Application filed December 9, 1921. Serial No. 521,141.

*To all whom it may concern:*

Be it known that I, CARL BREER, a citizen of the United States, residing at Summit, in the county of Union and State of New Jersey, have invented new and useful Improvements in a Stop Device for Sinks, of which the following is a specification.

The ordinary kitchen sink as commonly used simply acts as a spill for conveniently holding receptacles and for emptying such receptacles. The present invention is designed to provide means whereby the common sink may be itself used as a receptacle. The invention contemplates utilizing the discharge pipe of the sink as a mounting for the device so that it may be readily attached to the standard sink by merely inserting the device in the pipe fittings forming the discharge.

The invention is illustrated in the accompanying drawings as follows:—

Fig. 1 shows a central section of a sink with the device in place.

Fig. 2 a front view of the operating handle.

Fig. 3 a detached view of the operating cam.

Fig. 4 a view of the return bend at the end of the over-flow loop.

Fig. 5 an enlarged horizontal section through the valve body.

1 marks the sink, 2 the front fold of the ordinary sink, and 3 a rearwardly extending flange forming a space 4 between the rear wall of the sink and the house wall 5 against which the sink may be arranged, 6 a discharge opening in the sink, 7 a nipple extending through the opening, 8 a flange extending from the nipple to form a closure with the sink bottom, 9 a strainer on the nipple 7, and 10 screw threads arranged on the lower end of the nipple.

A valve body 11 has a screw-threaded end 12 adapted to screw on to the nipple 7 and secure the same in the bottom of the sink in the manner that is ordinarily accomplished by the discharge fitting. The valve body is provided with a diaphragm 13 having the passage 14 through it surrounded by a valve seat. The valve element, or head 15 operates on this seat to close the opening. This body may be of resilient material if desired. A stem 16 extends from the head 15 through a guide 17. The guide 17 is carried by a detachable fitting 18 having the screw threads 19 for screwing into the lower end of the valve body. The fitting has a downwardly screw-threaded extension 20. The guide 17 is carried by a spider 21. A spring 22 is arranged between the valve head and the spider 21 and is of sufficient strength to close the valve when the valve is released. The extension 20 is connected with a pipe 23 by means of the flanged nut 24 and the pipe 23 with a trap 26 by means of a slip joint 25. The trap connects with the drain pipe 27 which ordinarily extends into the wall.

A cam 28 is mounted on a stem 29. The stem extends through a stuffing box guide 30 and is provided with a handle 31 by means of which the stem may be turned, thus actuating the cam 28 to bring it against and into engagement with the valve so as to open the valve. The cam is preferably pointed and extends in both directions so that the handle may be turned in either direction to permit the closing of the valve. The pointed end of the stem extends into a depression 32 in the top of the valve so as to lock the valve in open position. The valve stem is provided with a groove 33. A pin 34 extends through the follower of the stuffing box into the screws, thus locking the stem in place.

The body is provided with the passages 35 and 36, the passage 35 communicating with the body above the diaphragm 13 and the passage 36 communicating with the body below the diaphragm 13. The passage 35 is closed to the body of the valve by a wall 38 and the passage 36 to the body of the valve by a wall 37. The valve body is provided with a flange 39 to which is secured a flange 40 by means of screws 41. The flange 40 has openings registering with the passages 35 and 36 and a pipe 42 extends from the opening registering with the pipe 35 toward the rear and this pipe has an upward extension 43 leading to a return bend 44. A pipe 45 is connected to the return bend paralleling the pipe 42 and extends to the flange 40 communicating with the opening 36. These passages 35 and 36 with the pipe with its loop forms a bypass around and closing the element of the valve and the upwardly extending loop forms an overflow for the sink when the valve is closed, the top of the loop determining the level in which liquid may accumulate in the sink. This device may be readily attached to the ordinary discharge fittings of standard sinks and converts such sink from a mere spill to a receptacle which may itself be used for the purpose of washing dishes or similar uses. The valve stem and overflow loops are carried by the body and the valve stem extends to the front of the sink where it may be readily operated but is so covered by the sink as to cause no inconvenience to the operator and the loop extends into the space which is ordinarily formed by the sink along the rear wall.

What I claim as new is:—

1. In a stop device for sinks, the combination of a valve body adapted to form a part of a discharge conduit and having a valve diaphragm with a valve seat therein; a valve element operating on the seat; a stem on the element; a bypass around the closure formed by the element mounted on the valve body and having an upwardly extending loop extending to the rear; a fitting detachably secured to the body and having a guide for the stem; a spring tending to close the valve; and means mounted on the body opposite the loop and extending forward to a position adapting it to be operated from the front of the sink for actuating the valve element.

2. In a stop device for sinks, the combination of a valve body adapted to form a part of a discharge conduit and having a valve diaphragm with a valve seat therein; a valve element operating on the seat; a stem on the element; a fitting detachably secured to the body and having a guide for the stem; a spring tending to close the valve; and means extending forward from the valve body for actuating the valve element comprising a cam, and a stem extending from the cam.

3. In a stop device for sinks, the combination of a valve body adapted to form a part of a discharge conduit and having a valve diaphragm with a valve seat therein; a valve element operating on the seat; a stem on the element; a fitting detachably secured to the body and having a guide for the stem; a spring tending to close the valve; and means extending forward from the valve body for actuating the valve element comprising a cam adapted to lock the valve in open position and a stem extending from the cam.

4. In a stop device for sinks, the combination of a valve body adapted to form a part of a discharge conduit and having a valve diaphragm with a valve seat therein; a valve element operating on the seat; a stem on the element; a fitting detachably secured to the body and having a guide for the stem; a spring tending to close the valve; means extending forward from the body for actuating the valve element; and a bypass around the diaphragm mounted on the valve body and having an upwardly extending loop.

In testimony whereof I have hereunto set my hand.

CARL BREER.